United States Patent
Nowak et al.

Patent Number: 5,433,418
Date of Patent: Jul. 18, 1995

[54] SELECTIVELY-FLEXIBLE MOLD HAVING A SHELL SUPPORTED BY A COLLAPSIBLE TRUSS STRUCTURE

[75] Inventors: Kenneth M. Nowak, Easton; Stephen R. Norko, Shelton, both of Conn.

[73] Assignee: United Technologies Corporation, Hartford, Conn.

[21] Appl. No.: 173,311

[22] Filed: Dec. 22, 1993

[51] Int. Cl.⁶ .............................................. B29C 33/48
[52] U.S. Cl. .................................. 249/139; 249/179; 249/183; 264/313; 425/389; 425/403; 425/438; 425/440; 425/470
[58] Field of Search ............... 425/179, 193, 389, 390, 425/403, 438, 440, 470; 249/139, 153, 179, 183, 134; 264/313

[56] References Cited

U.S. PATENT DOCUMENTS

| | | | |
|---|---|---|---|
| 1,568,957 | 1/1926 | Camp | 249/153 |
| 2,356,860 | 8/1944 | Lewis | 425/389 |
| 2,374,386 | 4/1945 | Shakesby | 249/183 |
| 3,433,451 | 3/1969 | Hittel | 249/179 |
| 4,695,032 | 9/1987 | Desport | 425/470 |
| 4,882,118 | 11/1989 | Megarry | 425/389 |
| 5,071,338 | 12/1991 | Dublinski et al. | 425/403 |
| 5,152,949 | 10/1992 | Leoni et al. | 425/417 |

FOREIGN PATENT DOCUMENTS

| | | | |
|---|---|---|---|
| 2328088 | 6/1977 | France | 249/179 |
| 2143101 | 3/1973 | Germany | 425/440 |

*Primary Examiner*—Jay H. Woo
*Assistant Examiner*—Robert B. Davis
*Attorney, Agent, or Firm*—Holland & Associates; Richard H. Kosakowski

[57] ABSTRACT

A selectively-flexible, selectively-rigid, reusable, one-piece mold is used to fabricate a composite part having a complex shape on an outer surface of the mold. Disposed within the interior of the shell is a grid-type support truss structure having a plurality of individual support members attached at one end to headers that are attached by clips to the inside surface of the shell at predetermined locations. The support members are locked in place relative to each other by the use of pins placed in holes formed at various locations in the support members. When locked in place in this manner, the shell is stiffened, thereby facilitating the fabrication of the composite part on the mold. When the pins are removed, the shell is allowed to flex, thereby facilitating the removal of the cured composite part from the outer surface of the mold.

21 Claims, 4 Drawing Sheets

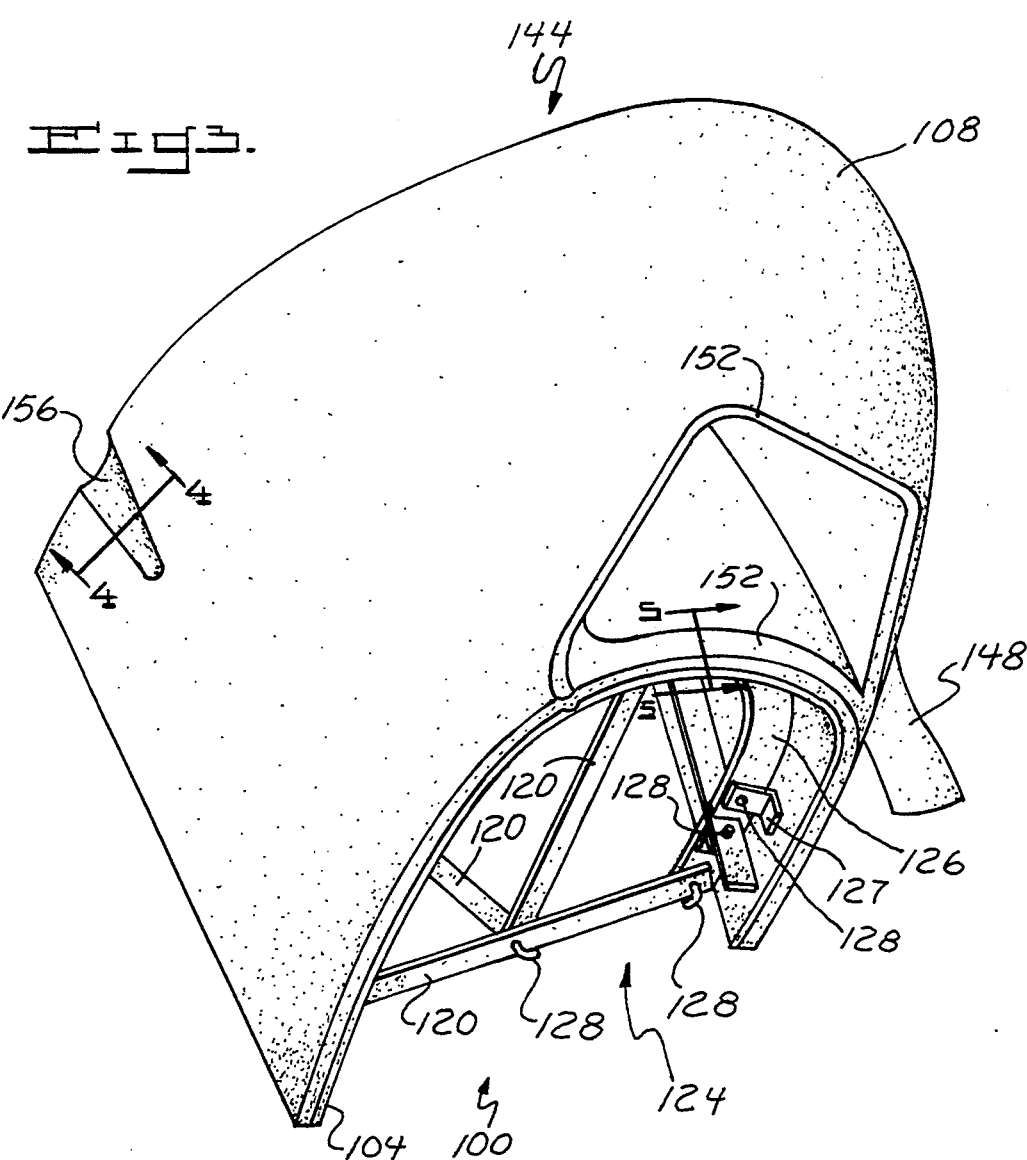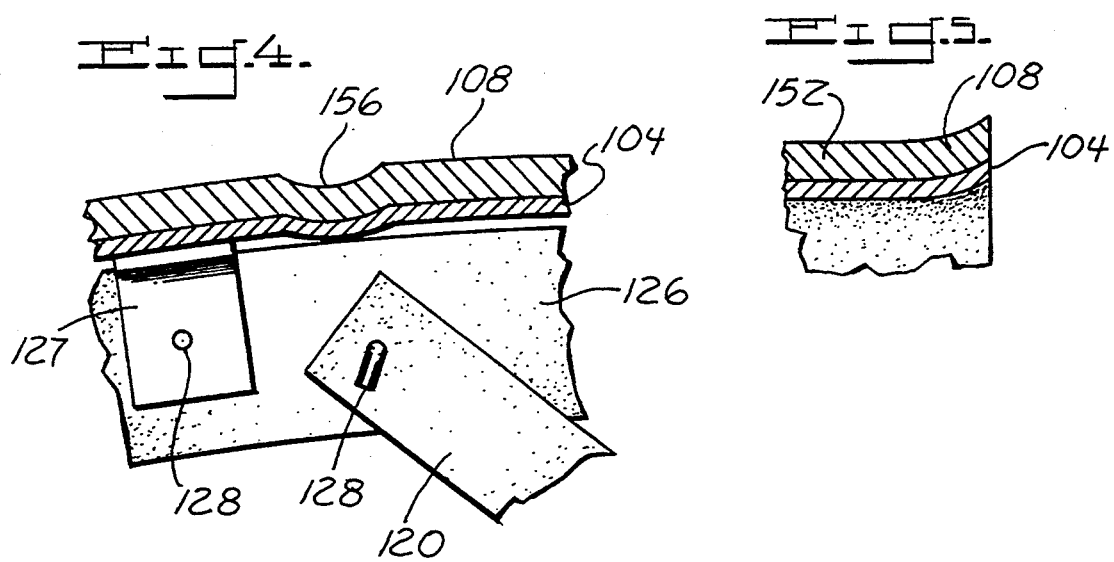

SELECTIVELY-FLEXIBLE MOLD HAVING A SHELL SUPPORTED BY A COLLAPSIBLE TRUSS STRUCTURE

BACKGROUND OF THE INVENTION

This invention relates to final molds for forming composite parts, to intermediate molds (i.e., splashes) for forming final molds, and to master molds (i.e., mock-ups) for forming intermediate molds, and more particularly to any of the three molds that is a reusable, one-piece mold that is selectively stiffened or flexible to facilitate the formation and removal of another mold or a composite part from the mold.

Conventional prior art molding practices used for fabricating finished composite parts having complex shapes often require a final mold comprising a unitary part or a plurality of segments. This practice is common, for example, when fabricating finished composite parts for an aircraft or rotorcraft, such as the nacelle for an engine. It is also used in fabricating the intermediate tooling components, such as mock-up and splash molds, that are used in the fabrication of the final mold. That is, it is known to first fabricate a master mold, termed a "mock-up", that may be a "male" part having surface contour features of the ultimate part to be formed (e.g., engine nacelle). Next is typically formed from the mock-up an intermediate mold, termed a "splash" which may be a "female" mold. Then, the final mold is formed from the splash. It is from this final "male" mold that the engine nacelle or other part is fabricated. It is to be understood throughout the discussion and teachings herein, including the claims, that the term "mold" may refer to not only the final mold, but also to the mock-up and intermediate ("splash") molds. These mock-up and splash molds may also be referred to together herein as intermediate tooling. Also, the mock-up, splash and final molds may be either "female" or "male" molds, depending upon the application.

Nevertheless, after the composite part or shell of the fabricated mold (i.e., the splash or final mold) that is formed on a shell of the mold has cured, the unitary mold or mold segments are removed to free the composite part or fabricated mold therefrom. As a result of this process, the unitary mold or mold segments are usually damaged. This is because the composite part or shell of the fabricated mold typically has a complex shape; i.e., one with regions having sharply defined peaks and/or valleys. Such complex shape makes it difficult to separate the mold from the composite part or fabricated mold without damaging the mold. It is also because the prior art molds were entirely rigid, such rigidity being required to properly support the composite part or fabricated mold during its formation. On the other hand, a mold that was flexible at all times would not properly support the composite part or fabricated mold. Thus, the prior art practice of using rigid unitary or segmented molds is costly and comparatively labor intensive.

Heretofore, no known reusable unitary molding apparatus has been devised that facilitates the formation of composite parts or fabricated molds having complex shapes and their removal therefrom.

Accordingly, it is a primary object of the present invention to provide reusable, selectively-flexible, selectively-rigid, one-piece, mock-up, splash and final molds for forming, respectively, the corresponding splash and final molds and finished composite parts.

It is a general object of the present invention to provide such a reusable, one-piece mold that saves considerable amounts of labor and parts costs as compared to prior art conventional rigid unitary or segmented molds that would be damaged or would not maintain vacuum integrity during part removal from the mold.

It is a further object of the present invention to provide a unitary final mold for fabricating finished composite parts having complex shapes, the final mold being selectively-flexible to allow it to be removed from the finished composite part without damaging the final mold.

It is yet another object of the present invention to provide a unitary master mold (e.g., a mock-up) for fabricating a unitary intermediate mold (e.g., a splash), or to provide a unitary splash for fabricating a final mold, the mock-up and splash molds being selectively flexible to facilitate removal of the corresponding fabricated mold therefrom without damaging the mock-up or splash molds.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicants have invented a selectively-flexible, reusable, unitary (i.e., "one-piece") final mold or master (mock-up) or intermediate (splash) mold. In a preferred embodiment of a final mold for use in fabricating a composite part having a complex shape, such as the engine nacelle of a helicopter, the final "male" mold comprises a shell made of a composite material similar to that of the composite part to be fabricated on the final mold. The shell comprises one or more layers of hardened (i.e., "cured") composite material. On the surface of the shell is fabricated the desired composite part in layered or laminated fashion. The shell has the desired well-defined contours formed in its outer surface to facilitate the fabrication of the corresponding contours in the finished composite part.

Disposed within the interior of the shell is a grid-type or egg-crate support truss comprised of a plurality of individual support members attached by pins or bolts at one end to one or more corresponding headers that are attached by clips to the inside surface of the shell. The one or more headers generally follow the contour of the inside surface of the shell. The supports can be locked in place relative to each other through use of locking pins placed in throughbores or holes formed at various locations in the supports. Each pin is placed thorough corresponding holes in two or more supports. Also, additional supports may connect longitudinally between the headers to provide further support for the shell. When locked in place in this manner, the shell is stiffened and cannot deflect (i.e., cannot flex). The areas of the shell that are desired to flex may be comprised of a lesser number of layers of composite material. That is, the flexible locations of the shell are thinner than the relatively non-flexible shell locations. The desired composite part is then fabricated over the stiffened shell by layering the composite material to the desired thickness over the outer surface of the shell. A release agent may be applied on the outer shell surface of the final mold to prevent the composite part from adhering to the outer shell surface.

After the composite part has cured, the locking pins holding the support truss together are removed. The flexible nature of the composite material shell at those selected locations of the final mold allows those locations to deflect or flex inward up to, e.g., two inches. This is especially desirable for the complex areas of the finished composite part; that is, those areas having sharply defined peaks and/or valleys. The selectable flexing of the final mold allows the composite part to be separated from the final mold without damaging the final mold, such damage being the major drawback in prior art non-flexible molds, discussed hereinbefore.

BRIEF DESCRIPTION OF THE DRAWINGS

FIG. 3 is a perspective view of the final mold of FIG. 2 having a finished composite part formed on the outer surface of the final mold;

FIG. 4 is a cross-sectional illustration of a portion of the composite part and final mold of FIG. 3 taken along the lines 4—4 of FIG. 3;

FIG. 5 is a cross-sectional illustration of a portion of the final mold and composite part of FIG. 3 taken along the lines 5—5 of FIG. 3;

DETAILED DESCRIPTION OF THE PREFERRED EMBODIMENTS

Figure 1:
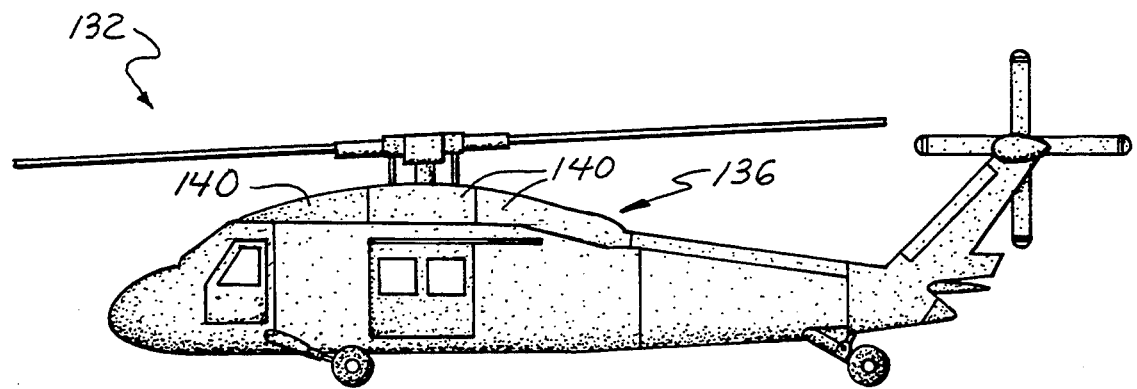
FIG. 1 is a perspective view of a helicopter with a structure comprised of one or more composite parts formed in accordance with the mold of the present invention.

Referring to the drawings in detail, a reusable, one-piece mold that can be selectively stiffened or deflectable is generally designated by the reference number 100. The mold comprises a shell 104, preferably formed from a composite material. The shell 104 has the desired shape of a finished composite part 108 that is to be formed on an outer surface 112 of the shell 104. The shell 104 preferably has varying thicknesses; with the shell 104 being relatively thicker at those locations or contours of the shell 104 where no flexing of the shell 104 is desired. On the other hand, in those locations of the shell 104 that are desired to flex, the thickness of the shell 104 may be relatively thinner. At predetermined locations on an inner surface 116 of the shell 104 are disposed a plurality of supports 120 that are arranged in a grid-type or egg-crate truss structure 124. Several of the supports 120 connect at one end to a corresponding one of a plurality of headers 126. Each header 126 generally follows the contour of the inside of the shell 104 and is attached to the inside surface of the shell 104 by clips 127. The supports 120 are typically located on the inner surface 116 of the shell 104 at those locations where the shell 104 is desired to flex. The supports 120 and headers 126 have holes formed therethrough, and pins or shoulder bolts 128 are inserted through the holes to connect together two or more of the supports 120, or to connect a support 120 to a header 126, thereby forming a rigid truss structure 124 that will not allow any flexing of the thinner, flexible portions of the shell 104. The pins or bolts 128, together with clips 127, are also used to connect supports 120 longitudinally between two or more headers 126 to provide further support for the shell. With the mold 100 in such a stiffened position or condition, the desired composite part 108 may be formed on the shell outer surface 112. After the composite part 108 has sufficiently cured, the pins 128 are removed from the truss supports 120 and the shell 104 is now allowed to naturally flex. Such flexing allows sufficient clearance so that the composite part 108 can be removed from the shell 104 without damaging the mold 100.

FIG. 1 is a perspective view of a typical helicopter 132, for example, a Black Hawk ® helicopter manufactured by Sikorsky Aircraft Division of United Technologies Corporation, the Assignee of the present invention. The outer structural shell 136 of the helicopter is comprised of a number of composite parts 140. As is often the case, these parts 140 may have complex shapes. It is to be understood throughout the discussion herein that a part 140 having a complex shape means a shape that has one or more sharply defined peaks and/or valleys in the contour of the part 140. For example, FIG. 3 illustrates an engine nacelle 144 composite part 108 having several complex areas. More particularly, the engine nacelle 144 has a flange lock-in area 148, an inlet lip lock-in area 152, as well as one or more additional lock-in areas 156. It is desirable that the engine nacelle 144 be formed as a unitary part comprising, for the most part, relatively smooth contours. However, the unitary engine nacelle 144 also comprises the aforementioned sharply defined complex lock-in areas 148–156. As described hereinbefore in the "Background of the Invention" section, typical prior art practice for providing molds for forming such complex parts as an engine nacelle 144 involve the use of either a unitary, homogeneously-rigid mold, or a mold comprised of a plurality of rigid segments.

Figure 2:
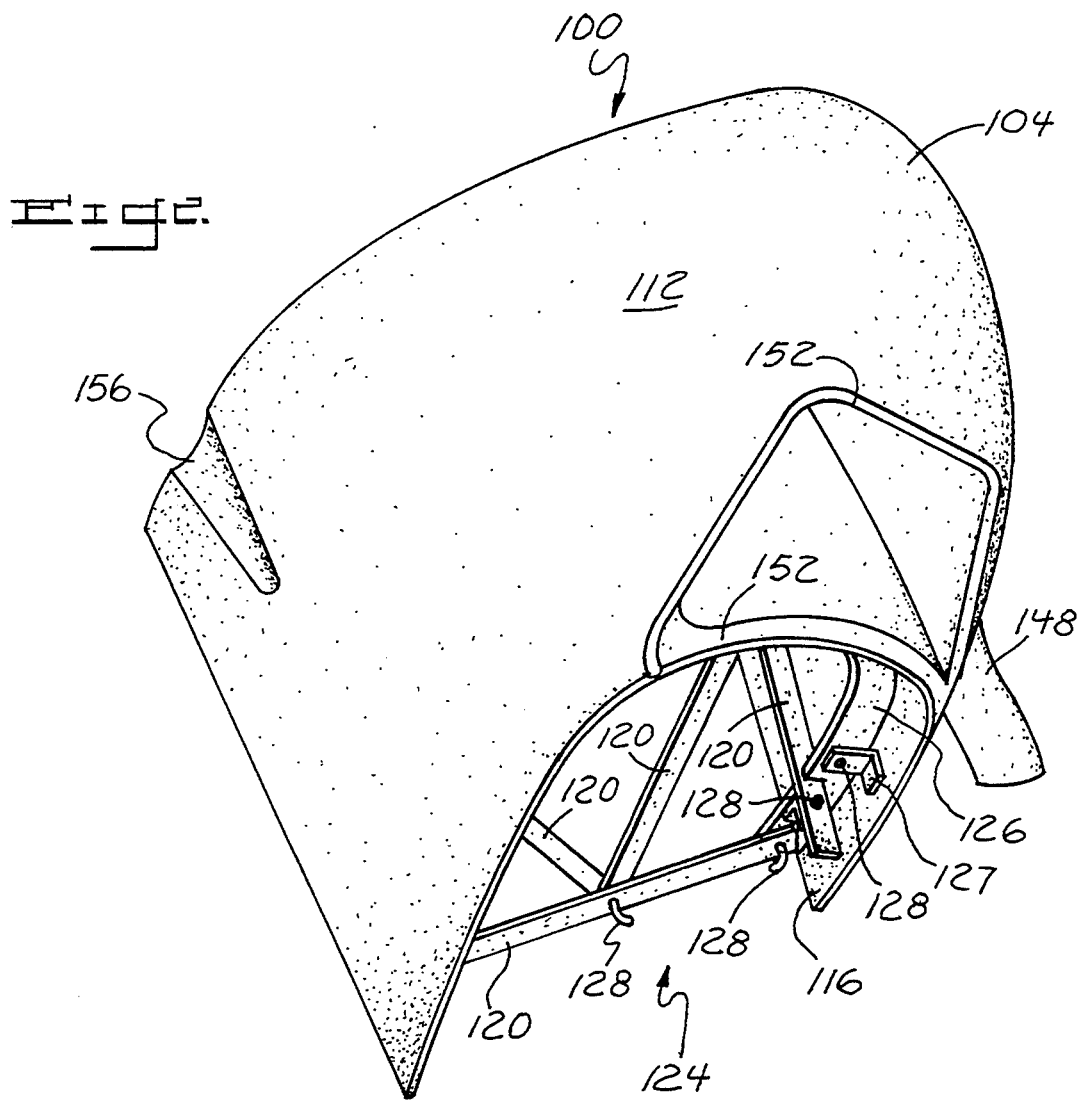
FIG. 2 is a perspective view of a selectively-flexible, unitary final mold in accordance with the present invention in an assembled position.
Figure 8:
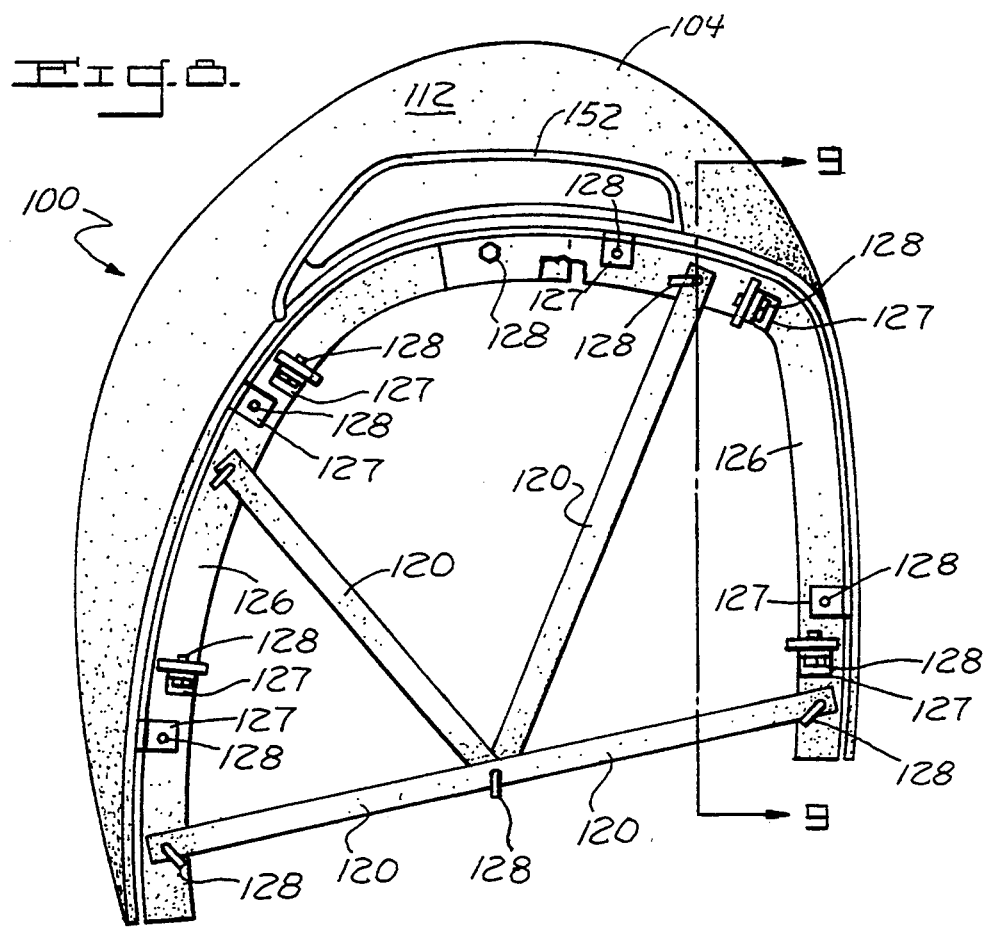
FIG. 8 is a front perspective view, partially cut away, of the final mold of FIG. 2 showing the truss structure of the present invention in greater detail.

FIGS. 2 and 8 illustrate the reusable, unitary, selectively-flexible mock-up mold 100 of the present invention. The mold 100 comprises the unitary shell 104 fabricated from one or more layers of a composite material. In an exemplary embodiment of the present invention, the shell material comprises the model REN 4014 or 4017 room temperature cure epoxy pre-impregnated cloth material provided by Ciba Geigy. The majority of the outer surface 112 of the shell 104 comprises a relatively smooth contour. Thus, such areas of the shell are desired to be permanently rigid. In the exemplary embodiment of the mold 100 of the present invention, such rigid areas comprise approximately five plies of the aforementioned room temperature cure epoxy pre-impregnated cloth material. Each ply of the aforementioned material used in the exemplary embodiment is approximately 12–13 thousandths of an inch (0.012–0.013") thick.

Also illustrated are several complex sections of the shell 104 that are desired to be relatively more flexible than the aforementioned smooth areas of the shell 104.

Such complex areas include the flange lock-in area 148, the inlet lip lock-in area 152, and one or more other lock-in areas 156. In these areas 148–156 of complex dimensions, the shell 104 is formed with approximately three plies of the aforementioned room temperature cure epoxy pre-impregnated cloth material. Thus, the shell 104 is relatively more rigid in those areas that are thicker, as compared to the problematic, complex-shaped lock-in areas 148–156, which are thinner. If desired, additional materials, such as graphite, may be added to the pre-impregnated cloth material to make it even more rigid in the desired areas.

Since the shell 104 of the mold 100 is comparatively more rigid in certain areas than others, the areas that are flexible must be braced in some manner to properly support the composite 108 part that is formed on the outer surface 112 of the shell 104. This is accomplished by the truss structure 124 of the present invention. In an exemplary embodiment the structure 124 comprises a plurality of strips or supports 120 made from, for example, a fiber board material. For example, the strip material may comprise the same model REN 4014 or 4017 room temperature cure epoxy pre-impregnated cloth provided by Ciba Geigy. The supports 120 are made by laminating a sufficient number of layers of the cloth material together to achieve a suitable rigidity, and then cutting the cured supports 120 to the desired length and width. In an exemplary embodiment, the thickness of the supports is approximately 0.25 inches. One end of each support 120 is attached to a header 126, fabricated out of the same material and at the same thickness as the supports 120. The header 126 attaches by L-shaped clips 127 to the inner surface 116 of the shell 104 at predetermined locations. A gap of approximately 0.25 inches is provided between the outer edge of the header 126 and the inner surface 116 of the shell 104. One side of each clip 127 is adhered to the inner surface 116 of the shell 104 by means of, e.g., adhesives. Each attachment clip 127 has a throughbore formed in the portion of the clip 127 that extends away from the inner surface 116 of the shell 104. Locking pins or shoulder bolts 128 may be used to attach the clips 127 to the headers 126 at appropriate locations. Also, two of the headers 126 may overlap by approximately three to four inches, with the overlapping portions being secured by pins or shoulder bolts 128.

Figure 9:
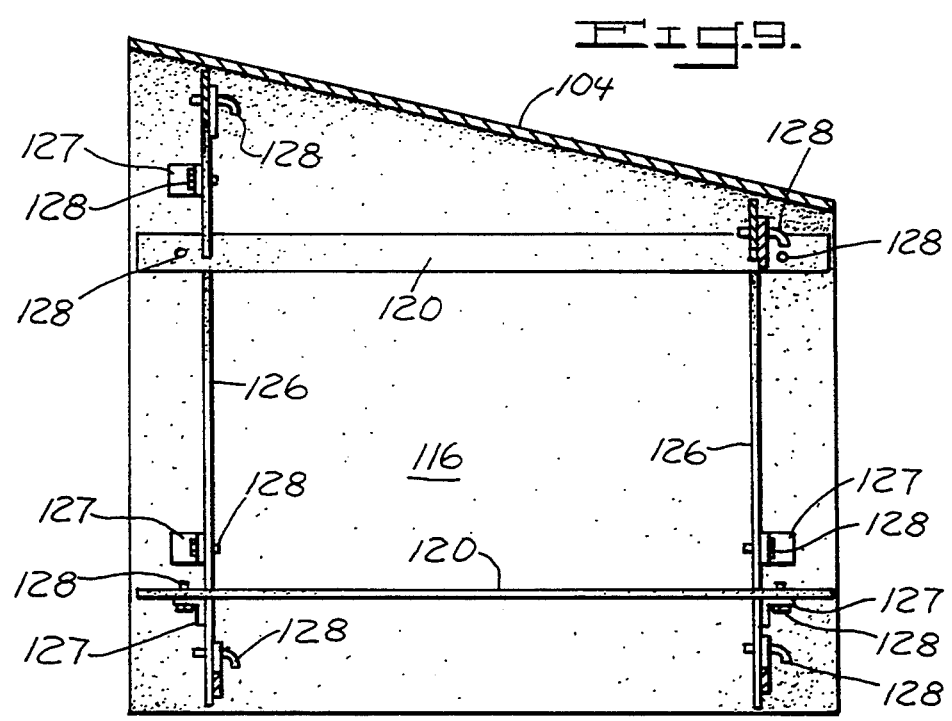
FIG. 9 is a cross-sectional illustration of a portion of the final mold of FIG. 2 taken along the lines 9—9 of FIG. 8.

Each of the supports 120 also has one or more throughbores formed at predetermined locations therein. One or more supports 120 may be attached to a header 126 by similar locking pins or shoulder bolts 128 inserted through holes in the header 126 and in the supports 120. The locking pin 128 may comprise an L-shaped piece of steel or other suitable material. Several headers 126 may also be connected together longitudinally by one or more supports 120, using the similar clips 127 and pins and/or bolts 128 (FIG. 9). This provides further support for the shell 104. Slots are typically formed at appropriate locations in the headers 126 to accommodate the longitudinal supports 120.

The opposite end of each of the supports 120 may be attached to each other by similar locking pins 128. The figures illustrate, without limitation, some of the various possibilities that exist for fabricating the supports 120 and headers 126 into a truss or egg-crate structure 124. They also illustrate the mold 100 of the present invention in a selectively-rigid or "stiffened" condition. That is, the mold 100 is illustrated as having its support structure 124 "pinned" in place. While in such a rigid condition, no deflection or flexing of the shell 104 is possible. The figures also illustrate the many various positions within the shell 104 at which the supports 120 and headers 126 may be attached. Typically, however, it is desirable to place such supports 120 and headers 126 on those portions of the shell 104 that would flex if not for the rigid support structure 124 of the present invention. Thus, it can be see from the foregoing that the rigid support structure 124 provides for selective flexing and stiffening of the shell 104 of the mold 100 of the present invention.

FIG. 3 illustrates the mold 100 of FIG. 2 in its rigid or stiffened position. It is also illustrative of a composite part 108 formed on the outer surface 112 of the shell 104. The composite part 108 (i.e., the engine nacelle 144 in the exemplary embodiment of the present invention) is fabricated on the shell 104 using known composite part fabrication techniques. For example, the composite part 108 may comprise a plurality of layers of a composite material similar to that of the shell 104 of the present invention. To prevent adherence of the composite part 108 to the outer surface 112 of the shell 104, the outer surface 112 of the shell 104 is typically coated with a release agent (not shown) before fabrication of the composite part 108 on the outer shell surface 112. FIGS. 4 and 5 are cross-sectional illustrations of several of the complex areas 152,156 of the composite part 108. For example, FIGS. 4 and 5 are illustrative of typical lock-in areas 152, 156 where the contour of the composite part 108 is more sharply defined than the remaining, relatively smoother, contour of the composite part 108.

After the composite part 108 has properly cured, the part must be removed from the mold 100. In the typical prior art comprising unitary or segmented molds that were permanently rigid, the mold was damaged, or would not maintain vacuum integrity during cure, so as to separate the mold from the composite part. This was because the various complex areas, such as the lock-in areas 148–156, prevented the composite part 108 (e.g., the engine nacelle 144) from being removed from the mold 100.

Figure 6:
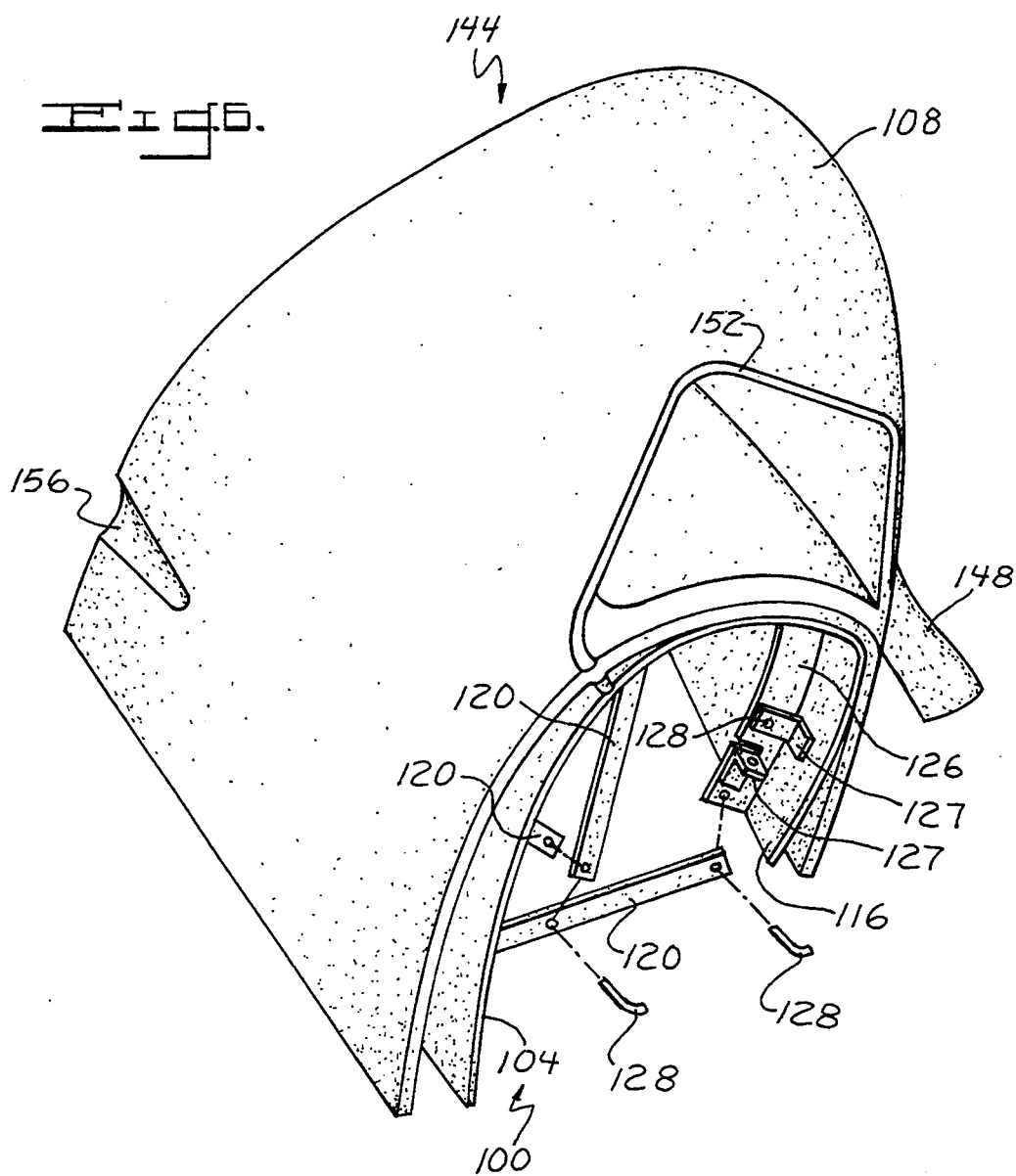
FIG. 6 is a perspective view of the final mold of FIG. 2 in a disassembled position to facilitate removal of the composite part therefrom.
Figure 7:
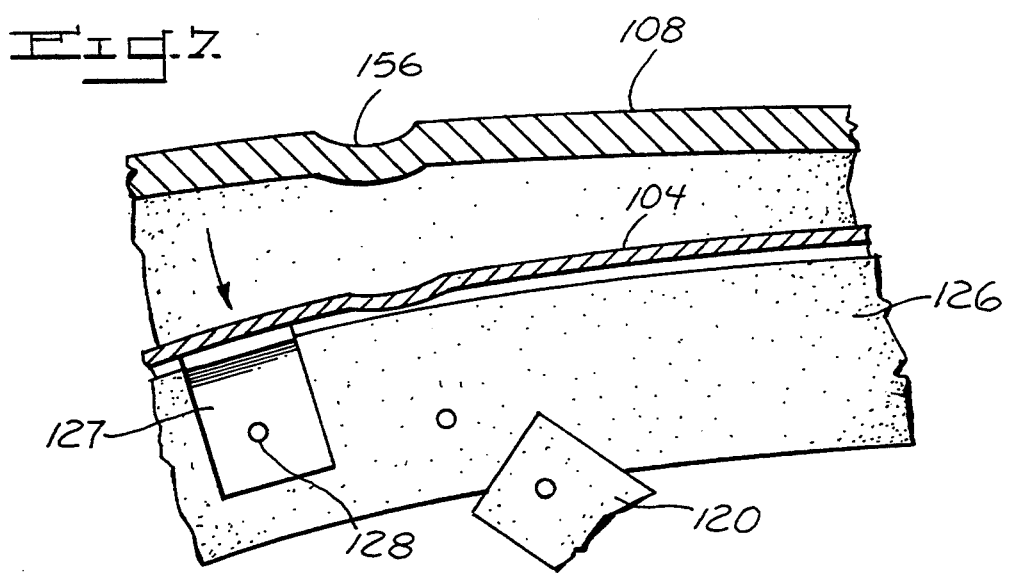
FIG. 7 is a cross sectional view of a portion of the disassembled final mold of FIG. 6 illustrating a portion of the finished composite part removed from the outer surface of the final mold.

In accordance with the selectively-flexible mock-up mold 100 of the present invention, such disadvantages of the prior art are obviated. FIGS. 6 and 7 illustrate the mold 100 of the present invention in the process of being separated from the composite part 108 formed on the outer shell surface 112. The composite part 108 is removed from the mold 100 by first removing the locking pins or shoulder bolts 128 from the truss structure 124. This causes a collapsing of the structure 124 which, in turn, causes the flexible portions of the shell 104 to naturally deflect or bend inwards. This flexing provides enough clearance to allow the shell 104 to be removed from the composite part 108, especially in those areas having complex shapes 148–156. In the exemplary embodiment of the mold 100 of the present invention, the shell 104 is allowed to flex up to a maximum of approximately two inches. This was found to be sufficient to allow the complex areas 148–156 of the composite engine nacelle 144 to clear the shell 104 during its separation therefrom. FIG. 7 illustrates in cross-section the composite engine nacelle 144 being separated from the shell 104 at the lock-in area 156 depicted in FIG. 4. FIG. 7 is also illustrative of the fact that, typically, the composite engine nacelle 144 is thicker and, therefore, more rigid, than the corresponding shell 104. Thus, the composite engine nacelle 144 does not itself flex to clear itself from the shell 104. Instead, the shell 104 flexes away from the part 144 to allow removal of the part 144 therefrom.

The mold 100 of the present invention has been described for use in fabricating an engine nacelle 144 for a rotorcraft 132. However, it is to be understood that the invention is not limited as such. Instead, the invention may be used to fabricate other types of parts for use on other types of crafts or permanent structures. Also, the present invention has been described for use in fabricating components having a portion or all of their contour of a relatively complex shape (i.e., having a shape with sharply defined angular peaks and/or valleys). However, the present invention may be used to fabricate parts that comprise entirely gently sloping contours.

Further, the invention has been described as comprising a shell 104 made of a composite material that is similar to the composite material that comprises the engine nacelle 144 formed on the shell's outer surface 112. However, it is to be understood that the shell 104 may comprise any suitable material that is allowed to flex somewhat without any support structure 124 holding it rigidly in place. For example, the shell 104 may comprise a fiberglass or other type of epoxy material. A shell 104 comprised of a composite material similar to the composite material comprising the engine nacelle 144 was chosen partly for matching of thermal expansion coefficients between the shell 104 and the part 144.

Also, it is to be understood that the truss structure 124 illustrated in the figures is purely exemplary; the present invention in its broadest scope contemplates other types of support structures, which should be apparent to one of ordinary skill in the art. For example, it is not necessary to use supports 120 that are generally rectangular in shape; other shapes of supports may be utilized, if desired. Further, it may not be necessary to use headers 126 to connect the supports 120 to the inner surface 116 of the shell 104. Instead, the supports 120 may be fastened directly to the inner surface 116 of the shell 104, or through use of other means. Still further, the supports 120 have been described and illustrated as being connected by locking pins or shoulder bolts 128 inserted through holes or throughbores formed in the supports 120. However, it is to be understood that other means for connecting together the supports 120 into a truss-like structure 124 are contemplated by the present invention.

Still further, the mold 100 of the present invention has been described specifically herein with respect to a preferred embodiment as being a "final" mold of the "male" type from which a composite part 108, such as an engine nacelle, is formed on its outer surface 112. However, it is to be understood that the present invention encompasses intermediate tooling; that is, molds that are used to make other molds. For example, in a sequence of three molds, an initial mold would be a master or "mock-up" mold. The mock-up mold may be of the "male" type, in which the truss structure is disposed within the "inside" of the shell, or the mock-up mold may be of the "female" type, in which the truss structure is disposed around the "outside" of the shell. The use of a selectively-flexible master ("mock-up") mold in accordance with the present invention obviates some of the disadvantages of known prior art master molds that were typically formed from a rigid material such as wood, metal or plastic.

In either case, material, such as a composite material, is layed-up on a surface of the shell of the mock-up mold. The composite material, when cured, may be termed generically as a "part" and is removed from the shell 104 and attached to a truss structure. The cured composite material or "part" is itself in the form of a shell. The resulting structure is an intermediate mold, or "splash". If the mock-up mold is a "male" mold, the splash would be a "female" mold.

In a similar fashion, a "final" mold is fabricated from the splash by laying-up composite material on a surface of the shell of the splash. Once cured, the composite material has a truss structure attached thereto, in accordance with the teachings herein If the splash mold is a "female" then the final mold is a male, much like that described hereinbefore with respect to the preferred embodiment. Again, the cured composite material of the final mold is in the form of a shell. Then, as described earlier, the finished composite part 108 is formed on the outer surface 112 of the shell 104 of the final mold.

Regardless of which mold (i.e., mock-up, splash or final) is utilized, and regardless of the type (i.e., male or female) of mold, the proper truss structure 124 to be utilized should be readily apparent to one of ordinary skill in the art in light of the teachings herein.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A selectively-flexible, selectively-rigid mold comprising:
   a. a shell comprised of a unitary piece of material and including a first surface having a predetermined contour for supporting a part formed thereon;
   b. a support truss comprising a plurality of support members;
   c. means for attaching an end of one or more of the support members to a second surface of the shell; and
   d. means for selectively engaging and disengaging two or more support members together, wherein when the two or more support members are engaged a portion of the shell in the area of the ends of the corresponding support members attached to the second surface of the shell is held in a stiffened position, and wherein when the two or more support members are disengaged a portion of the shell in the area of the ends of the corresponding support members attached to the second surface of the shell is allowed to flex.

2. The mold of claim 1, wherein the shell is fabricated from a composite material.

3. The mold of claim 1, wherein the shell is fabricated from a material having a predetermined thickness that allows the shell to flex in predetermined areas of the shell.

4. The mold of claim 1, wherein the shell is fabricated from a material having a predetermined thickness that allows the shell to be rigid in predetermined areas of the shell.

5. The mold of claim 1, wherein the means for selectively engaging and disengaging two or more support members comprises a locking pin disposed through holes formed at predetermined locations in the corresponding supports.

6. The mold of claim 1, wherein the means for attaching an end of one or more of the support members to a second surface of the shell comprises an adhesive.

7. The mold of claim 1, further comprising means, attached to the second surface of the shell, for attaching a corresponding one or more support members to the second surface of the shell.

8. The mold of claim 7, wherein the means for attaching a corresponding one or more support members to the second surface of the shell comprises an attachment clip affixed to the second surface of the shell.

9. The mold of claim 8, further comprising means for attaching the corresponding one or more support members to the corresponding attachment clip.

10. The mold of claim 9, wherein the means for attaching the corresponding one or more support members to the corresponding attachment clip comprises a locking pin.

11. In a mold used to fabricate a part on a first surface of the mold, the mold made up of a unitary piece of material, the mold's first surface having a predetermined contour that matches a desired contour of the resulting fabricated part, the improvement comprises:

a support truss comprising a plurality of support members, one or more of the support members having a first end that is selectively engaged and disengaged to a header that is attached to a second surface of the mold, the one or more support members having a second end being selectively engaged and disengaged to corresponding second ends of other support members, wherein when the two or more support members are engaged a portion of the mold in the area of the ends of the corresponding support members attached to the header is held in a stiffened position, the composite part being formed on the first surface of the mold when the mold is in the stiffened position, and wherein when the two or more support members are disengaged a portion of the mold in the area of the ends of the corresponding support members attached to the header is allowed to flex in an amount that allows the removal of the composite part away from the first surface of the mold.

12. A mold used to fabricate a part with a predetermined contour, comprising:

a. a shell comprised of a unitary piece of material and having a predetermined thickness and including a first surface having a predetermined contour, the first surface being operable to support the part fabricated thereon;

b. a support truss comprising a plurality of support members and one or more headers;

c. means for releasably attaching one or more of the support members to corresponding ones of the headers;

d. means for releasably attaching each of the one or more headers to a second surface of the shell; and e. means for releasably attaching a support member to another support member, wherein when the support members are attached to each other, the shell is in a stiffened position thereby facilitating the fabrication of the part on the first surface of the shell, and wherein when the support members are not attached to each other, the shell is allowed to flex thereby allowing the part to be removed away from the first surface of the mold.

13. The mold of claim 12, wherein the means for releasably attaching one or more of the support members to corresponding ones of the headers comprises an item from the group consisting of a pin or a bolt.

14. The mold of claim 12, wherein the shell is fabricated from a material having a predetermined thickness that allows the shell to flex in predetermined areas of the shell when the support members are not attached.

15. The mold of claim 12, wherein the shell is fabricated from a material having a predetermined thickness that allows the shell to remain inflexible in predetermined areas of the shell regardless of whether the support members are attached.

16. The mold of claim 12, wherein the means for releasably attaching a support member to another support member comprises an item from the group consisting of a releasable pin or a bolt, disposed in throughbores formed in the support members.

17. The mold of claim 12, further comprising means, attached to the second surface of the shell, for releasably attaching the headers to the second surface of the shell.

18. The mold of claim 17, wherein the means for releasably attaching the headers to the second surface of the shell comprises an attachment clip affixed to the second surface of the shell.

19. The mold of claim 18, further comprising means for attaching the corresponding header to the corresponding attachment clip.

20. The mold of claim 19, wherein the means for attaching the corresponding one or more support members to the corresponding attachment clip comprises an item from the group consisting of a releasable pin or a bolt, disposed in throughbores formed in the attachment clip and in the corresponding header.

21. The mold of claim 12, further comprising one or more longitudinal support members connected between two or more headers.

* * * * *